(12) United States Patent
Hong et al.

(10) Patent No.: US 8,039,414 B2
(45) Date of Patent: Oct. 18, 2011

(54) METHOD FOR PREPARING METAL CATALYST AND ELECTRODE

(75) Inventors: Suk-gi Hong, Suwon-si (KR); Tao-young Kim, Seoul (KR); Duck-young Yoo, Seoul (KR)

(73) Assignee: Samsung SDI Co., Ltd., Suwon (KR)

( * ) Notice: Subject to any disclaimer, the term of this patent is extended or adjusted under 35 U.S.C. 154(b) by 1215 days.

(21) Appl. No.: 11/282,609

(22) Filed: Nov. 21, 2005

(65) Prior Publication Data

US 2006/0110632 A1 May 25, 2006

(30) Foreign Application Priority Data

Nov. 20, 2004 (KR) .................. 10-2004-0095537

(51) Int. Cl.
*H01M 4/88* (2006.01)
*B01J 31/00* (2006.01)
*B01J 21/18* (2006.01)
*B01J 23/00* (2006.01)
*B01J 23/02* (2006.01)
*B01J 23/06* (2006.01)
*B01J 23/40* (2006.01)
*B01J 23/74* (2006.01)

(52) U.S. Cl. ........ 502/151; 502/101; 502/150; 502/182; 502/183; 502/185

(58) Field of Classification Search ............ 502/101, 502/150–151, 182–185
See application file for complete search history.

(56) References Cited

U.S. PATENT DOCUMENTS

| 4,331,490 A * | 5/1982 | Palgrave et al. ............... 149/46 |
| 6,294,068 B1 * | 9/2001 | Petrovic et al. ............... 205/414 |
| 2001/0041277 A1 * | 11/2001 | Chang ............................. 429/30 |
| 2004/0038801 A1 | 2/2004 | Kikuchi |
| 2004/0161641 A1 * | 8/2004 | Lee et al. ........................ 429/12 |
| 2004/0179980 A1 * | 9/2004 | Pattekar et al. ............... 422/130 |

FOREIGN PATENT DOCUMENTS

| CN | 1378299 | 11/2002 |
| CN | 1425499 | 6/2003 |
| CN | 1428882 | 7/2003 |
| CN | 1484545 | 3/2004 |
| JP | 11-503262 | 3/1993 |
| JP | 2002-184414 | 6/2002 |
| JP | 2003-190801 | 7/2003 |
| JP | 2004-171921 | 6/2004 |
| WO | WO 01/18894 A2 * | 3/2001 |

* cited by examiner

Primary Examiner — Melvin Mayes
Assistant Examiner — Kevin M Johnson
(74) Attorney, Agent, or Firm — H.C. Park & Associates, PLC.

(57) ABSTRACT

A method for preparing a metal catalyst includes a proton conductive material coating layer formed on the surface of a conductive material. Also, an electrode may be prepared using the metal catalyst. The method for preparing the metal catalyst comprises mixing the conductive catalyst material, the proton conductive material, and a first solvent, casting the mixture onto a supporting layer and drying the mixture to form a conductive catalyst containing film. The method further comprises separating the conductive catalyst containing film from the supporting layer and pulverizing the conductive catalyst containing film to obtain the metal catalyst. The method for preparing the electrode comprises mixing the metal catalyst with a hydrophobic binder and a second solvent, coating the mixture on an electrode support, and drying it.

13 Claims, 3 Drawing Sheets

METHOD FOR PREPARING METAL CATALYST AND ELECTRODE

CROSS REFERENCE TO RELATED APPLICATION

This application claims priority to and the benefit of Korean Patent Application No. 10-2004-0095537, filed on Nov. 20, 2004, in the Korean Intellectual Property Office, the disclosure of which is incorporated herein in its entirety by reference.

BACKGROUND OF THE INVENTION

1. Field of the Invention

The present invention relates to a metal catalyst and a fuel cell using an electrode that includes the catalyst. In particular, a metal catalyst has an improved catalytic efficiency in an electrochemical reaction and has a structure that promotes the permeation of gaseous reactants. A fuel cell that uses an electrode that includes the catalyst has improved efficiency.

2. Description of the Background

Fuel cells are emerging as a future source of clean energy that can replace fossil fuels.

The fuel cell is a power generating system that produces direct current by an electrochemical reaction between hydrogen and oxygen. A fuel cell includes a membrane electrode assembly (MEA) that has an electrolyte interposed between an anode and a cathode, and flow field plates for transferring gases. The electrodes include catalyst layers that are formed on supporting layers made of carbon paper or carbon cloth. However, it is difficult for gaseous reactants to reach the catalysts in the catalyst layer, and protons produced by the electrochemical reaction do not move rapidly. Thus catalysts have not been used effectively in electrodes.

The cathode and the anode are prepared by casting a slurry including a catalyst and an ionomer on a gas diffusion layer as a supporting layer, and drying the resultant to form a catalyst layer.

When the catalyst layer of an electrode is prepared in this way, the ionomer is doped in the catalyst or is simply mixed with the catalyst, which degrades the dispersion properties of the catalyst and causes agglomeration of the catalyst and the ionomer in the catalyst layer. As a result, an increase in the amount of unreacted catalyst due to secondary pores and non-uniform ionomers causes a reduction of catalyst utilization, a lack of fuel supply paths, and a reduction of the permeability of fuel, thereby significantly reducing the performance of the fuel cell. In addition, it is difficult to form and control a three-phase interface for an electrochemical reaction, and the catalytic efficiency is reduced.

FIG. 1B illustrates the structure of a conventional metal catalyst.

Referring to FIG. 1B, in a conventional metal catalyst 10, Pt particles 13 are present on the surface of the carbon 11, and PBI 12 is close to the carbon 11. In this structure, the dispersion properties of PBI and Pt/C deteriorate, and it is difficult to obtain a three-phase interface for an electrochemical reaction, and thus the catalytic efficiency is reduced.

SUMMARY OF THE INVENTION

The present invention provides a metal catalyst that exhibits an improved catalytic efficiency by having a three-phase interfacial structure that can facilitate contact between gaseous reactants and the catalyst. This allows it to rapidly transfer protons produced by an electrochemical reaction between the gaseous reactants.

The present invention also provides a method for preparing the catalyst, a method for preparing an electrode with improved efficiency by including a catalyst layer using the metal catalyst, and a fuel cell using the electrode prepared according to the method.

Additional features of the invention will be set forth in the description which follows, and in part will be apparent from the description, or may be learned by practice of the invention.

The present invention discloses a method for preparing a metal catalyst including a conductive catalyst material and a proton conductive material coating layer formed on the surface of the conductive material. The method comprises mixing the conductive catalyst material, the proton conductive material, and a first solvent and casting the obtained mixture onto a supporting layer. The mixture is dried to form a conductive catalyst containing film and the conductive catalyst containing film is separated from the supporting layer and pulverized.

The present invention also discloses a method for preparing an electrode comprising mixing a metal catalyst including a conductive catalyst material and a proton conductive material coating layer formed on the surface of the conductive catalyst material with a hydrophobic binder and a second solvent, to obtain a catalyst layer forming composition. The catalyst layer forming composition is coated on an electrode support and dried.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

A metal catalyst of the present invention includes a conductive catalyst material and a proton conductive material coating layer formed on the conductive catalyst material. This configuration allows the catalyst to easily form and control a three-phase interface for an electrochemical reaction, facilitate the contact between gaseous reactants and the catalyst through a thin coating layer of a proton conductive material formed on catalyst particles, and effectively transfer protons generated in the electrochemical reaction. When an electrode is formed using the catalyst, an ideal three-phase interfacial electrode structure may be formed, and a fuel cell that includes the electrode may have improved performance, such as high efficiency.

Figure 2:
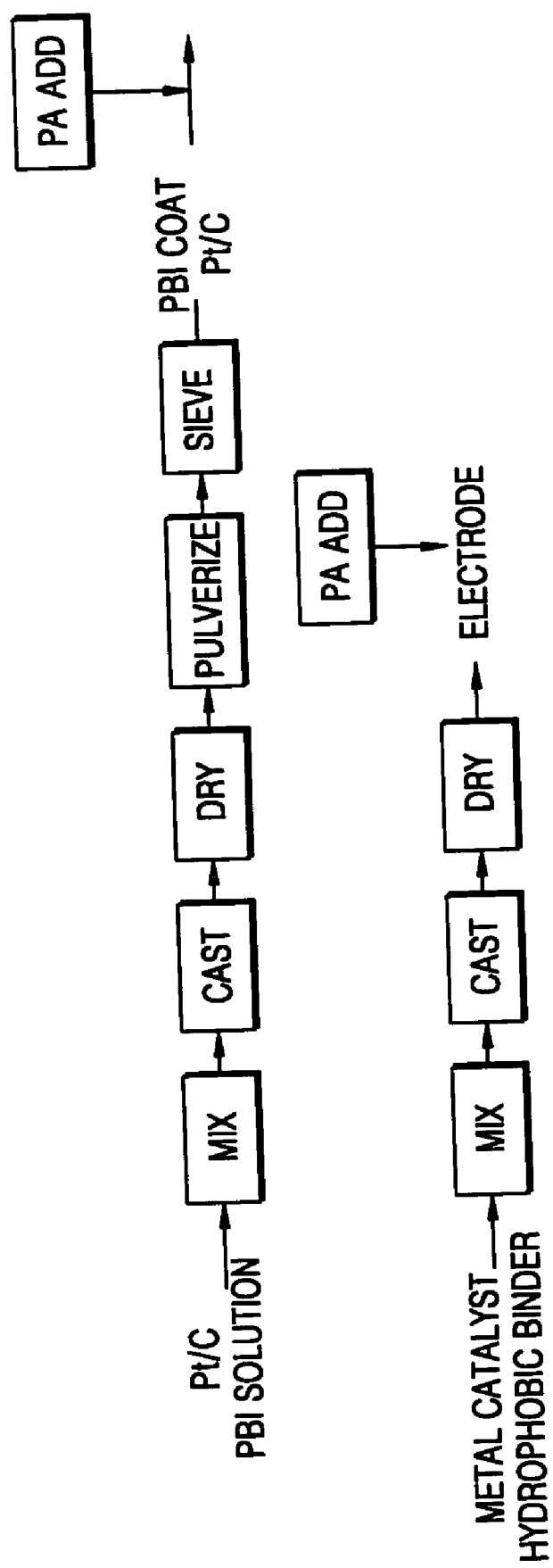
FIG. 2 illustrates the process of preparing an electrode according to the present invention.

FIG. 2 illustrates the process of preparing the metal catalyst and an electrode using the metal catalyst.

As shown in FIG. 2, a method for preparing the metal catalyst of the present invention includes doping the proton conductive material with an acid and mixing it with a first solvent and a conductive catalyst material. This coats the proton conductive material onto the surface of the conductive catalyst material.

Then, the above mixture is cast onto a supporting layer and dried. The resulting coating may be a continuous or a discontinuous film. The drying temperature is in the range of about 80° C. to about 120° C. The resulting coating is separated from the supporting layer to obtain a conductive catalyst containing film. The conductive catalyst containing film is pulverized and sieved to obtain a metal catalyst with a specific particle size. The particle size is preferably in the range of about 50 μm to about 70 μm.

The proton conductive material may be an ionomer including, but not limited to polybenzimidazole (PBI), polyetherketone, polyetherimide, polysulfone, perfluorosulfonic acid, and the above ionomers doped with an acid.

In the metal catalyst of the present invention, the concentration of the proton conductive material is preferably about 1 wt % to about 50 wt %, in particular, about 3 wt % to about 10 wt %, based on the total weight of the conductive catalyst material. When the concentration of the proton conductive material is less than about 1 wt %, the efficiency of the catalyst is reduced due to an inability to form a three-phase interface in the catalyst layer. When the concentration of the proton conductive material is greater than about 50 wt %, the diffusion of gaseous reactants to the catalyst is slowed by the thick coating of the proton conductive material on the electrical conductive catalyst.

The acid may include, but is not limited to phosphoric acid.

Examples of the conductive catalyst material may include Pt, Fe, Co, Ni, Ru, Rh, Pd, Os, Ir, Cu, Ag, Au, Sn, Ti, Cr, mixtures thereof, alloys thereof, and a carbon material having these elements supported thereon, for example.

The supporting layer may include, but is not limited to a Teflon® sheet, a Mylar® film, a glass substrate, a polyethylene terephthalate sheet.

The first solvent disperses or dissolves the conductive catalyst material and the ionomer. Examples of the first solvent may include, but are not limited to N-methylpyrrolidone (NMP), dimethylacetamide (DMAc), dimethylformamide (DMF), and trifluoroacetic acid (TFA), etc. The concentration of the first solvent may be about 900 wt % to about 4000 wt % based on the weight of the ionomer. When the concentration of the first solvent is less than about 900 wt %, the proton conductive material is not sufficiently dissolved and the conductive catalyst material is not uniformly dispersed. When the concentration of the first solvent is greater than about 4000 wt % it takes too long to dry.

After the above process, the metal catalyst may be doped with an acid to further enhance the metal catalyst's proton conductivity. Phosphoric acid or similar acids may be used for this. The acid concentration may be about 200 mol % to about 1000 mol %, and preferably about 200 mol % to about 750 mol %, based on 100 moles of the proton conducting material.

Figure 1A:
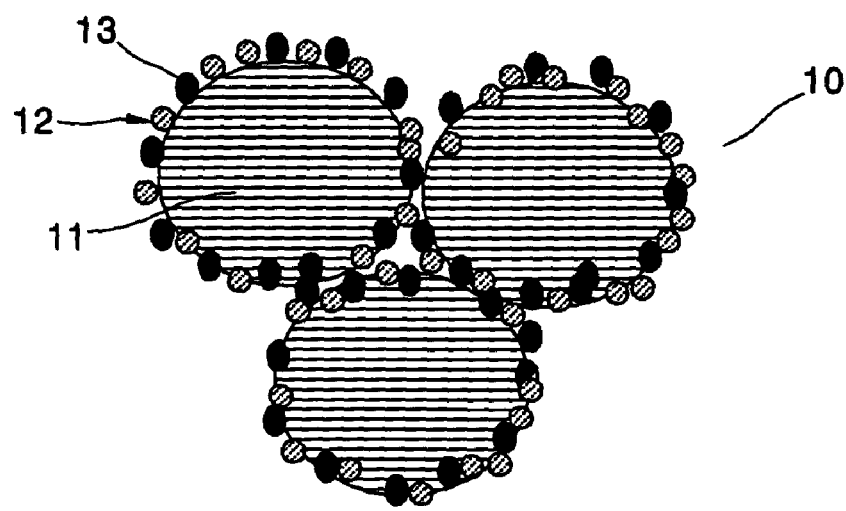
FIG. 1A and FIG. 1B are schematic diagrams of the structures of a metal catalyst of the present invention and a conventional metal catalyst, respectively.
Figure 1B:
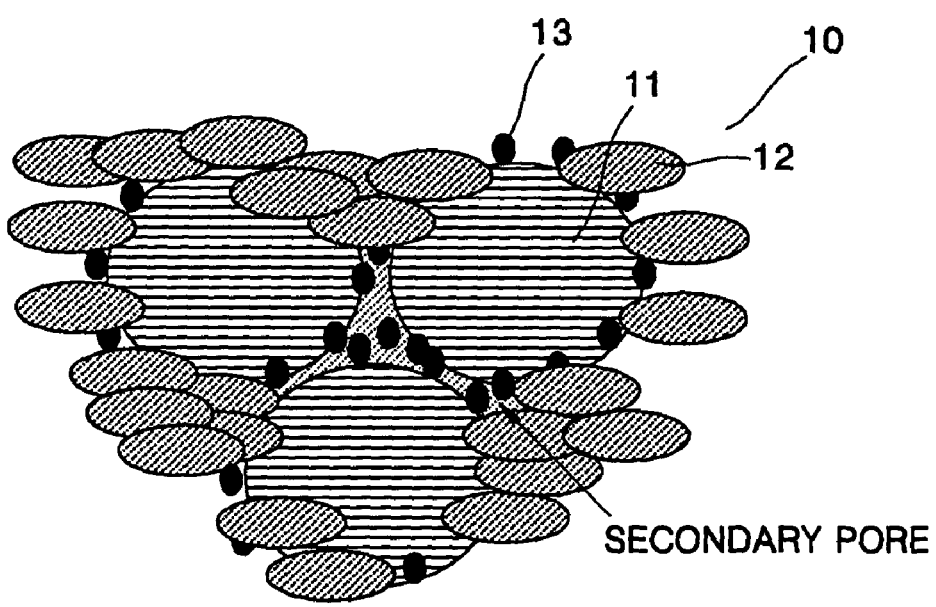

The structure of the metal catalyst of the present invention is described with reference to FIG. 1A. As shown in FIG. 1A, a carbon supported Pt (Pt/C) catalyst is used as the conductive catalyst material and polybenzimidazole (PBI) is used as a proton conductive material.

In a metal catalyst 10, carbon 11 is coated with PBI 12, and Pt particles 13 are present on the surface of the carbon 11. Although it is not shown in FIG. 1A, Pt particles 13 may also be thinly coated with porous PBI.

Although it is not shown in FIG. 1A, when metal catalyst particles coated with PBI are doped with phosphoric acid, $H_3PO_4$ is bound to an N—H site of PBI through a hydrogen bond, to form a proton transfer path. The carbon 11 acts as an electron transfer path, and protons are transferred by phosphoric acid.

In order to form an electrode, the metal catalyst is then mixed with a hydrophobic binder and a second solvent, as shown in FIG. 2. The mixture is then coated onto an electrode supporting layer and dried. The drying temperature of the coating is in the range of about 60° C. to about 150° C. When the drying temperature is out of the above range, the coating is not dried well and the carbon carrier is oxidized, which is not preferable.

The hydrophobic binder may include, but is not limited to polytetrafluoroethylene (PTFE) and fluorinated ethylene propylene (FEP). The concentration of the hydrophobic binder may be about 1 wt % to about 40 wt % based on the total weight of the metal catalyst. When the concentration of the hydrophobic binder is out of the above range, satisfactory proton conductivity and electrical conductivity of the electrode can not be obtained.

The second solvent is selected based on the hydrophobic binder, and is not limited as long as it does not dissolve the proton conductive material and can dissolve or disperse the hydrophobic binder. The second solvent may include a fluorine-based organic solvent, for example. The concentration of the second solvent is about 500 wt % to about 10,000 wt % based on the total weight of the metal catalyst.

The electrode supporting layer may include, but is not limited to carbon paper or carbon cloth.

The electrode facilitates the formation of a three-phase interface for an electrochemical reaction, improves the contact between the gaseous reactants and the catalyst through the thin coating layer on the catalyst, and effectively transfers protons produced by the electrochemical reaction.

The structure of the metal catalyst of the present invention will be described with reference to FIG. 1A. As shown in FIG. 1A, a carbon supported Pt (Pt/C) catalyst is used as the conductive catalyst material and polybenzimidazole (PBI) is used as a proton conductive material.

In a metal catalyst 10, carbon 11 is coated with PBI 12, and Pt particles 13 are present on the surface of the carbon 11. Although it is not shown in FIG. 1A, Pt particles 13 may also be thinly coated with porous PBI.

Although it is not shown in FIG. 1A, when metal catalyst particles coated with PBI are doped with phosphoric acid, $H_3PO_4$ is bound to an N—H site of PBI through a hydrogen bond, to form a proton transfer path. The carbon 11 acts as an electron transfer path, and protons are transferred by phosphoric acid.

A fuel cell of the present invention will now be described in detail.

The fuel cell of the present invention includes a cathode, an anode, and an electrolyte membrane interposed between the cathode and the anode. At least one of the cathode and the anode includes the supported catalyst of the present invention, as described above.

The fuel cell of the present invention may be embodied as a phosphoric acid fuel cell (PAFC), a proton exchange membrane fuel cell (PEMFC), or a direct methanol fuel cell (DMFC), for example. The structure and preparation of these fuel cells are not limited, and since they are specifically described in a variety of sources, they will not be described here.

The present invention will be described in greater detail with reference to the following examples. The following examples are for illustrative purposes only and are not intended to limit the scope of the invention.

Example 1

1.0 g of Pt/C, 0.05 g of PBI and 1.45 mL of NMP were mixed and stirred at 250 rpm at room temperature for about 3 hours. The mixture was cast onto a Teflon® (Dupont) sheet and dried in vacuum at 120° C. for 1 hour. The resulting dried mixture was pulverized and sieved to obtain PBI coated Pt/C with a particle size of about 50 µm to about 70 µm.

0.032 g of phosphoric acid (200 mol % of PA with respect to 100 mole of PBI) was added to the PBI coated Pt/C to increase the PBI's proton conductivity. Then, the doped catalyst was mixed with Cytop® (Japan Asahi Glass) and a solvent and the mixture was stirred at room temperature for about 3 hours to obtain a catalyst layer forming composition in a slurry form.

The slurry was coated onto carbon paper using an applicator with a gap of about 120 µm, and then dried at 80° C. for 3 hours and 120° C. for 1 hour, to form an electrode.

Example 2

An electrode was prepared in the same manner as in Example 1, except that 0.064 g of phosphoric acid (400 mol % of PA with respect to 100 mole of PBI) was used.

Example 3

An electrode was prepared in the same manner as in Example 1, except that 0.160 g of phosphoric acid (1000 mol % of PA with respect to 100 mole of PBI) was used.

Example 4

An electrode was prepared in the same manner as in Example 1, except that 0.352 g of phosphoric acid (2200 mol % of PA with respect to 100 mole of PBI) was used.

Example 5

A fuel cell was prepared using an electrode comprising the metal catalyst of Example 1 and a PBI electrolyte membrane. Hydrogen and air were used as a fuel and an oxidant, respectively.

Example 6, Example 7, and Example 8

Fuel cells were prepared in the same manner as in Example 5, except that metal catalysts of Example 2, Example 3 and Example 4, respectively, were used instead of the metal catalyst of Example 1.

Figure 3:
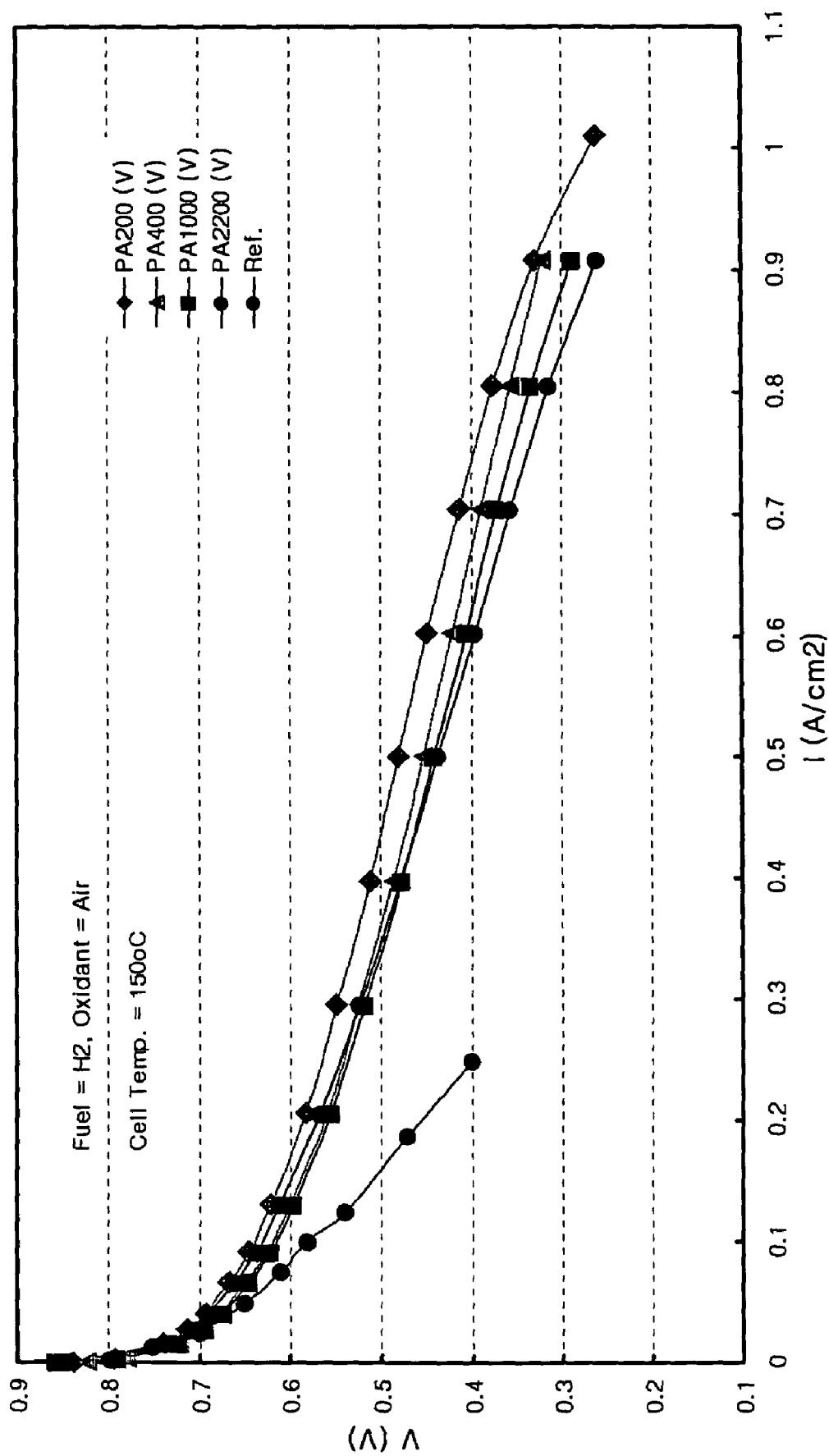
FIG. 3 is a graph showing the relationship between current and voltage (I-V) of electrodes in fuel cells prepared according to Example 5, Example 6, Example 7, and Example 8.

The current-voltage characteristics (I-V) of the fuel cells were examined and the results are shown in FIG. 3. In FIG. 3, PA200, PA400, PA1000 and PA2200 are the results for Example 5, Example 6, Example 7, and Example 8, respectively.

Referring to FIG. 3, the fuel cell that uses an electrode that had a doping level of 200 mol % phosphoric acid based on 100 moles of the proton conductive material showed the best performance at 0.549 V at a current density of 0.3 A/cm$^2$. FIG. 3 shows that the higher the doping level of phosphoric acid, the lower the performance of the fuel cell in the gas diffusion controlled region.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for preparing a metal catalyst, comprising:
   mixing a conductive catalyst material, a proton conductive material, and a first solvent to form a mixture;
   wherein the proton conductive material comprises an acid-doped ionomer,
   casting the mixture onto a supporting layer and drying it to form a conductive catalyst containing film;
   separating the conductive catalyst containing film from the supporting layer and pulverizing the conductive catalyst containing film; and
   treating the pulverized resultant with a first acid,
   wherein the first acid is phosphoric acid,
   wherein the metal catalyst has a particle size between 50 and 70 µm, and
   wherein no other acids are used in treating the pulverized resultant.

2. The method of claim 1,
   wherein the phosphoric acid has a concentration of about 200 mol % to about 750 mol %, based on 100 moles of the proton conductive material.

3. The method of claim 1,
   wherein the first solvent is at least one selected from the group consisting of N-methylpyrrolidone (NMP), dimethylacetamide (DMAc), dimethylformamide (DMF), and trifluoroacetic acid (TFA).

4. The method of claim 1,
   wherein the proton conductive material is the acid-doped form of at least one selected from the group consisting of polybenzimidazole, polyetherketone, polyetherimide, polysulfone, and perfluorosulfonic acid.

5. The method of claim 1,
   wherein the concentration of the proton conductive material is about 1 wt % to about 50 wt % based on the total weight of the conductive catalyst material.

6. The method of claim 1,
   wherein the concentration of the first solvent is about 900 wt % to about 4000 wt % based on the total weight of the proton conductive material.

7. The method of claim 1,
   wherein the conductive catalyst material is Pt, Fe, Co, Ni, Ru, Rh, Pd, Os, Ir, Cu, Ag, Au, Sn, Ti, Cr, a mixture thereof, an alloy thereof, or a carbon material having these elements supported thereon.

8. The method of claim 1,
   wherein the conductive catalyst material is carbon supported Pt (Pt/C), and the proton conductive material is polybenzimidazole doped with phosphoric acid.

9. The method of claim 1,
   wherein the drying is carried out at between 80° C. to 150° C.

10. The method of claim 1,
    wherein the proton conductive material is the acid-doped form of at least one selected from the group consisting of polyetherketone and perfluorosulfonic acid.

11. The method of claim 1,
    wherein the conductive catalyst material is Co, Ni, Os, Cu, Ag, a mixture thereof, an alloy thereof, or a carbon material having these elements supported thereon.

12. The method of claim 1, wherein the concentration of the phosphoric acid is about 200 mol % to about 1000 mol % based on 100 mole of the proton conductive material.

13. The method of claim 1, wherein the concentration of the proton conductive material is about 3 wt % to about 10 wt % based on the total weight of the conductive catalyst material.

* * * * *

UNITED STATES PATENT AND TRADEMARK OFFICE
CERTIFICATE OF CORRECTION

| | | |
|---|---|---|
| PATENT NO. | : 8,039,414 B2 | Page 1 of 1 |
| APPLICATION NO. | : 11/282609 | |
| DATED | : October 18, 2011 | |
| INVENTOR(S) | : Suk-gi Hong et al. | |

It is certified that error appears in the above-identified patent and that said Letters Patent is hereby corrected as shown below:

Cover sheet, left column,

Item (75)   Inventors: "Tao-young Kim, Seoul (KR)" should read -- Tae-young Kim, Seoul (KR) --

Signed and Sealed this
Twenty-eighth Day of August, 2012

David J. Kappos
*Director of the United States Patent and Trademark Office*